United States Patent [19]

Diaz

[11] Patent Number: 4,803,849

[45] Date of Patent: Feb. 14, 1989

[54] REFRIGERATION/EVAPORATIVE COOLER UNIT

[76] Inventor: Henry E. Diaz, 555 W. Warner Rd., Space 125, Chandler, Ariz. 85224

[21] Appl. No.: 200,458

[22] Filed: May 31, 1988

[51] Int. Cl.⁴ .............................................. F28D 5/00
[52] U.S. Cl. ...................................... 62/311; 62/332; 62/DIG. 16
[58] Field of Search .................. 62/311, 332, DIG. 16

[56] References Cited

U.S. PATENT DOCUMENTS

| | | | |
|---|---|---|---|
| 2,030,032 | 2/1936 | Keyes | 62/311 |
| 3,182,718 | 5/1965 | Goettl | 62/311 X |
| 3,859,818 | 1/1975 | Goettl | 62/311 |
| 4,505,327 | 3/1985 | Angle et al. | 62/332 X |
| 4,698,979 | 10/1987 | McGuigan | 62/332 X |

*Primary Examiner*—Lloyd L. King
*Attorney, Agent, or Firm*—LaValle D. Ptak

[57] ABSTRACT

An evaporative cooler unit is disclosed for installation as an "add-on" unit to a pre-existing roof-mounted refrigeration air-conditioning unit. The conventional air supply and return ducts from and to the air-conditioning unit are removed and are interconnected with ducts in the evaporative cooler conversion unit. Pressure actuated dampers are provided which automatically cause air to be supplied through the supply duct into the building from whichever one of the units, the refrigeration unit or the evaporative cooler unit, is operated. Similarly, return air always flows from the building into the return duct. When the refrigeration unit is operating, the return air recirculates in the normal manner. When the evaporative cooler unit is operating, the return air is vented outside into the area surrounding the cooler housing. The dampers automatically operate to provide the desired air flow paths in response to air pressure from the air moving apparatus in the refrigeration unit and the evaporative cooler unit, respectively, as one or the other of these units is operated.

12 Claims, 2 Drawing Sheets

REFRIGERATION/EVAPORATIVE COOLER UNIT

BACKGROUND

Twenty to thirty years ago cooling of residential and business establishments in warm arid or semi-arid climates was accomplished by means of evaporative coolers. These coolers rely upon the cooling effect obtained from moving a relatively dry air stream across water saturated pads to cool the air stream which then is supplied to the interior of the building to be cooled. Typically, the air exhausted from such a building has been exhausted through open doors and windows, since evaporative cooling systems do not employ recirculating air. Evaporative coolers are very effective during periods when the relative humidity is low and the ambient temperature is relatively high. Such coolers are relatively inexpensive to operate, since they require power only for operation of a blower or fan and require relatively modest amounts of water.

As the humidity increases, however, evaporative coolers become less effective and produce a damp clammy feeling to the inhabitants of a dwelling or building if the coolers are used on days having relatively high humidity.

Upon the development of relatively efficient and relatively inexpensive refrigeration systems, evaporative coolers steadily have been replaced with such refrigeration units over the past twenty to twenty-five years. In fact, most new construction in warm, semi-arid climates has included refrigeration units exclusively with very little new construction utilizing evaporative coolers.

Recently, however, energy costs have escalated considerably; so that renewed interest in evaporative cooling has taken place. An ideal solution to overcoming the shortcomings of both evaporative coolers and refrigeration units, appears to be to use both types of units, operating one or the other in accordance with the temperature and humidity conditions existing on any given day. For example, if the humidity is high, the refrigeration unit is operated to cool the building. If the humidity is low, the most efficient cooling of the building space is accomplished by the evaporative cooler.

Two patents which are directed to original equipment combination refrigeration and evaporative cooling air conditioner units are U.S. Pat. Nos. 3,182,718 and 3,859,818 to Goettl. In the system of U.S. Pat. No. 3,182,718, a single or common blower is employed to deliver either evaporatively cooled air or refrigerated air through the supply duct of the space to be cooled. Dampers are provided to recirculate air when the unit is used in a refrigeration mode of operation and to draw outside air through the unit when it is used as an evaporative cooler. In the evaporative cooler mode of operation, the air returned from the space to be cooled is exhausted into the atmosphere around the unit. The damper positions of the device shown in U.S. Pat. No. 3,182,718 are established by an electrically operated mechanical actuator to switch the air path from one which is suitable for a refrigeration unit to one which is suitable for operation as an evaporative cooler and vice-versa.

The Goettl U.S. Pat. No. 3,859,818 also is directed to a combination refrigeration and evaporative cooling air-conditioner. The unit of this patent has the refrigeration unit and the evaporative cooler unit located together in a single housing. Separate blowers are used for each unit. When the device is operated as a refrigeration unit, the normal air movement through the supply and return air ducts takes place. When the refrigeration unit is turned off and the evaporative cooler is turned on, a spring loaded damper is opened to cause the delivery of air from the evaporative cooler through both the delivery and return ducts of the refrigeration unit. Consequently, with the system disclosed in this patent, it is necessary to exhaust the air from the building through open doors, windows or other openings when the system is operated in the evaporative cooler mode.

Another approach to a combination refrigeration unit/evaporative cooler is disclosed in the U.S. Pat. No. 4,505,327 to Angle. This patent also discloses a custom composite interconnected refrigeration unit and evaporative cooler. When the system is operated as an evaporative cooler, the doors and windows may be closed. Air returned from the rooms of the building is returned through the return duct and is vented into the attic of the building in which the system is located. The system of the Angle Patent also utilizes the evaporative cooler unit to cool the condensor coils of the refrigeration unit when the refrigeration unit is operated to supply cooling air to the building interior. This condensor pre-cooling air then is vented into the attic of the building.

Two other patents which are directed to combination refrigeration units and evaporative cooler units, are the U.S. Pat. No. 3,252,508 to Goettl and U.S. Pat. No. 4,351,163 to Johannsen. The systems disclosed in these patents operate to use the same air supply ducts to supply cooled air into the building interior. In the evaporative cooler mode of operation, however, the return air duct is not used and it is necessary to exhaust the air out of the building through ceiling vents or open doors and windows in a conventional manner.

It is desirable to provide a simple and effective evaporative cooler unit which can be added onto pre-existing refrigeration air-conditioning units and which automatically switches over the duct work from the refrigeration mode to the evaporative cooler mode whenever one or the other of the blowers of these two systems is operated. It further is desirable to provide an evaporative cooler conversion unit which vents the return air outward into the atmosphere when the unit is operated in the evaporative cooler mode.

SUMMARY OF THE INVENTION

It is an object of this invention to provide an improved combination refrigeration and evaporative cooler air-conditioning system.

It is another object of this invention to provide an improved air-conditioning system.

It is additional object of this invention to provide an improved combination evaporative cooler and refrigeration air-conditioning system which shares the same duct work.

It is a further object of this invention to provide an automatically operated air flow controlling system for permitting an evaporative cooler and a refrigeration unit to share the same supply and return ducts, the controlling system automatically routing the air in accordance with the differential air pressure created when the blower for the refrigeration unit or the blower for the evaporative cooler unit is operating.

In accordance with a preferred embodiment of the invention, an evaporative cooler conversion unit is disclosed for use with an existing refrigeration air-conditioning unit having an air outlet for supplying air to a point of use and having an air inlet for receiving air from the point of use for recirculation through the refrigeration unit. The conversion unit includes an evaporative cooler housing with air inlets and an air outlet therein; a blower is provided in the evaporative cooler housing which is separate from the air moving means in the refrigeration unit. When the evaporative cooler blower is operated, air is drawn into the cooler housing through the air inlets and is supplied to a blower outlet. The blower outlet is coupled with the air outlet of the refrigeration unit in common to supply air to the point of use. This coupling includes a damper for selectively providing an air flow path from one or the other of the blower outlet and the refrigeration unit outlet to the point of use. The air outlet in the cooler housing also is coupled with the air inlet of the air-conditioning unit and includes another damper which closes the air outlet in the cooler housing when the refrigeration unit is operated and opens the air outlet in the cooler housing when the evaporative cooler blower is operated to discharge air from the point of use into the area surrounding the cooler housing. The dampers are operated automatically in response to air pressure differentials created by the operation of the respective blowers in the refrigeration unit and the evaporative cooler housing.

DETAILED DESCRIPTION

Figure 1:
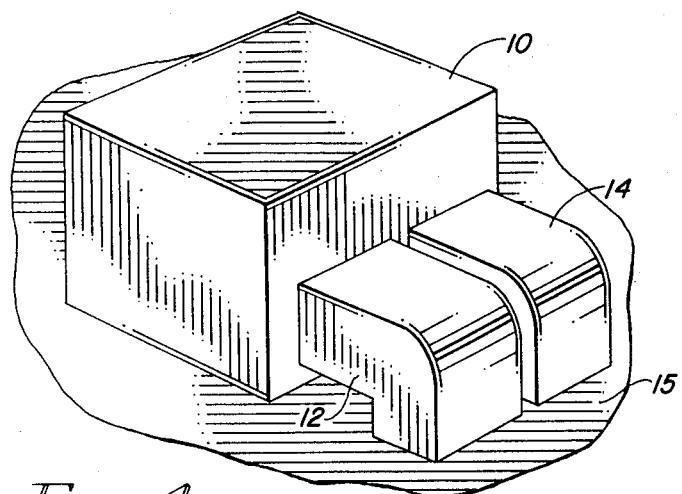
FIG. 1 is a top perspective view of a typical conventional roof-mounted refrigeration air-conditioning unit.

Reference now should be made to the drawings which illustrate the environment of and the operation of a preferred embodiment of the invention. FIG. 1 is a diagramatic perspective view of a conventional pre-existing refrigeration air conditioning unit of the type with which a preferred embodiment of the invention may be used. Such a refrigeration unit 10 constitutes conventional heat exchange parts (not shown) including a compressor, condensor, expansion valve, evaporator and appropriate air flow duct work. The unit 10 also typically includes a fan or other means for cooling the condensor coil. Since any mechanical refrigeration unit 10 of the types commonly employed may be used for the unit 10, no details of the structure of that unit are illustrated.

For the purposes of understanding the preferred embodiment of this invention, it should be noted that cooled air passing through the evaporator of the refrigeration unit 10 is supplied through a supply duct 12. Similarly, return air from the space to be cooled is supplied from that space back to the unit 10 through a return duct 14. The refrigeration unit 10 includes a blower or fan for constantly recirculating this air to pull the warmed air from the space into the unit through the return duct 14, pass that air over the evaporator or through the evaporator, and then discharge the cooled air back into the space to be cooled through the supply duct 12. Units of the type illustrated as unit 10 typically are mounted on the roof 15 of a building, with the elbow portions of the ducts 12 and 14 exposed as illustrated.

For units of the general configuration shown in FIG. 1, the invention proposes adding an evaporative cooler, without in any way altering the conventional operation of the refrigeration unit 10. The evaporative cooler 20 is mounted in the area where the ducts 12 and 14 normally bend or have the elbow extending from them through the roof 15 of the building. Consequently, the ducts 12 and 14 are cut or disconnected at the points where they attach into the casing for the refrigeration unit 10. They also are cut or disconnected at the point where they extend downwardly into the roof 15 of the building. After this is done, the evaporative cooler unit 20 is set in place. The unit 20 may be any conventional type of evaporative cooler, typically having water saturated cooling pads located on three sides with air inlets or louvers 21 to permit air to be drawn from the surrounding atmosphere through the pads and discharged into the building. The cooler 20 may be a flow through type or recirculating type. The particular water handling system is not significant for the purposes of the invention, so the normal evaporative components have not been shown for the cooler 20 in order to avoid cluttering of the drawing.

Figure 3:
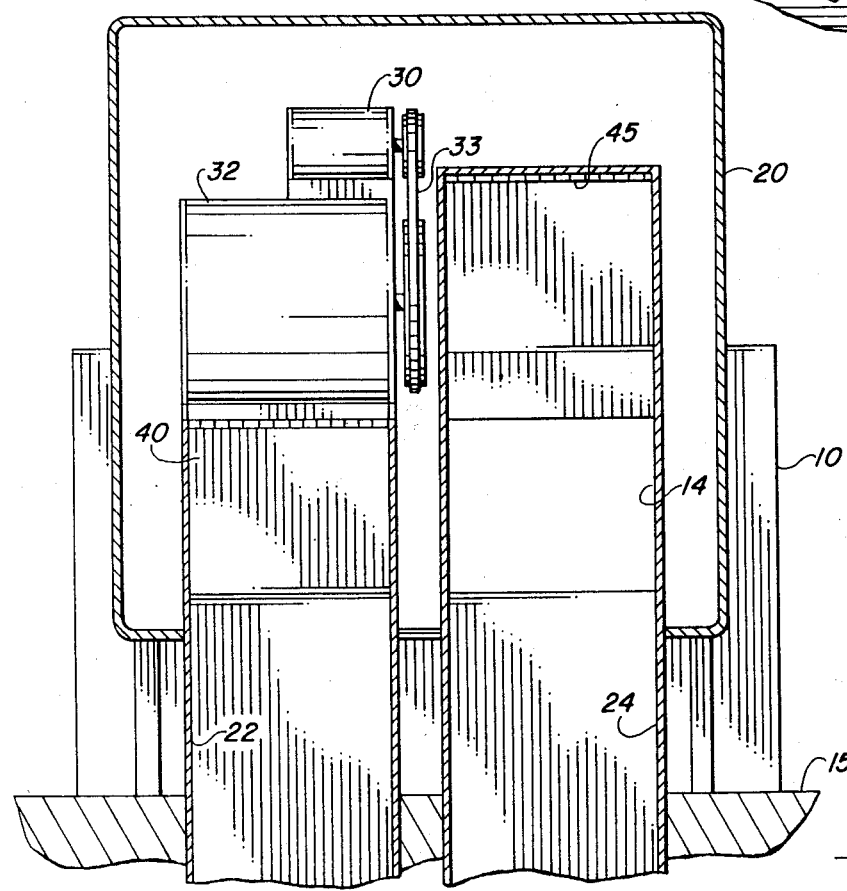
FIG. 3 is a cross-sectional view taken along the line 3—3 of the unit in FIG. 2.
Figure 4:
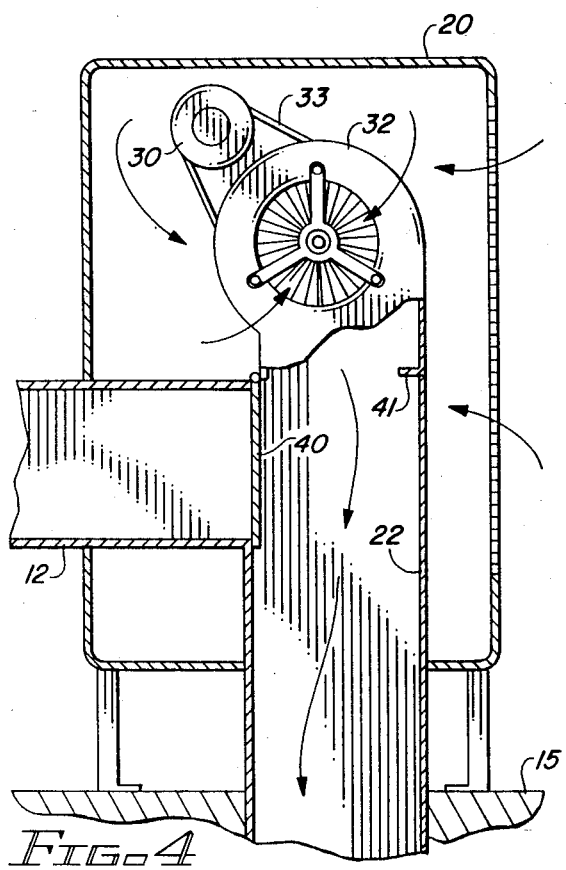
FIG. 4 is a cross-sectional view taken along the line 4—4 showing the operation of the unit of FIGS. 2 and 3 in the evaporative cooler mode to supply air.
Figure 5:
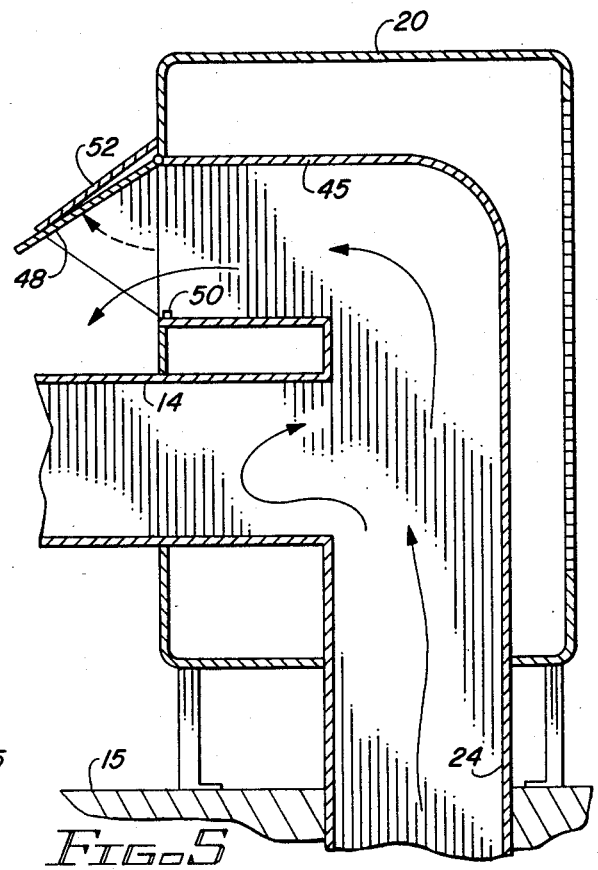
FIG. 5 is a cross-sectional view taken along the line 5—5 of FIG. 2 illustrating the return air operation of the unit when it operates in the evaporative cooler mode.

FIGS. 3, 4 and 5 illustrate the manner in which the interconnections between the duct work located within the cooler 20 is interconnected with the duct work passing through the roof 15 of the building and the horizontal portions of the ducts 12 and 14 extending out of the refrigeration unit 10.

Since the ducts 12 and 14 are located side-by-side, the blower 32 for the evaporative cooler is physically located with a discharge duct 22 directly over the original opening in the roof 15 for the downwardly turned portion of the supply duct 12. This is illustrated in FIGS. 3 and 4. The blower 32 is operated by a conventional electric drive motor 30 through a drive belt 33. A relatively high volume of air is supplied by the blower 32 in accordance with standard operating procedures for evaporative coolers of the type used for the cooler 20.

Similarly, the return air duct coming out of the roof, where the downwardly turned portion of the elbow 14 of FIG. 1 has been cut away, is interconnected with a return duct 24 inside the housing 20 of the evaporative cooler. This duct has two openings in it, as shown most clearly in FIG. 5, the lowermost one of these openings is connected directly to the horizontal portion of the duct 14 which is left extending from the refrigeration unit 10. Directly above this opening (as shown most clearly in FIG. 5) the duct has a discharge opening 45 through a gravity closed barometric or pressure damper 48. The damper 48 normally rests against a stop 50 in the outwardly turned portion 45 of the return air duct, and the opening is shielded from the elements by means of a suitable shield 52.

The supply duct 22 of the evaporative cooler also opens at right angles immediately beneath the blower 32 into the end of the horizontal portion of the supply duct 12 from the refrigeration unit 10. This is shown most clearly in FIGS. 4 and 6. The opening from the supply 12 duct into the duct 22 normally is closed by a gravity closed barometric or pressure damper 40 which extends downwardly as shown most clearly in FIG. 4.

When the unit is operated as an evaporative cooler, control switches within the space to be cooled are used to turn off the blower and other components of the refrigeration unit 10. At the same time, the motor 30 for operating the fan of the evaporative cooler is turned on; and the cooler 20 then functions in a normal way to draw air through the inlets 21 on three sides. This air passes through water saturated pads and is cooled in a conventional manner. The cooled air is drawn into the blower 32 and is discharged downwardly through the duct 22. The pressure of the air within the duct 22 tends to hold the damper 40 firmly closed, so that no air leakage takes place back into the supply duct 12. This mode of operation is shown in FIG. 4.

Figure 2:
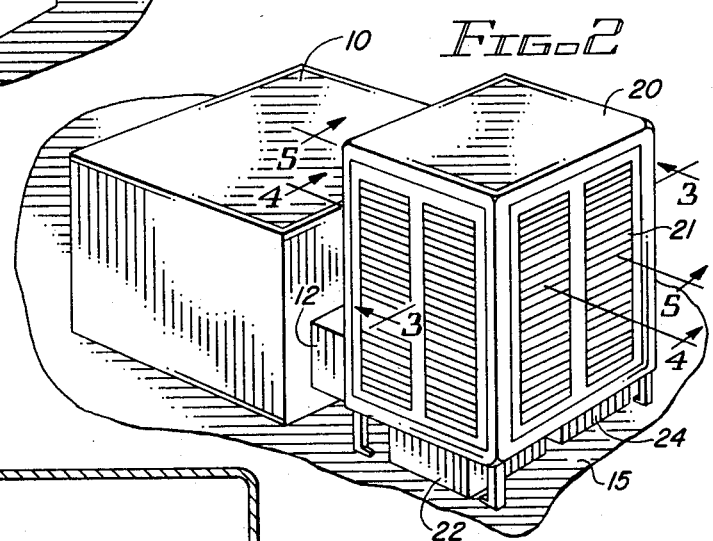
FIG. 2 shows the unit of FIG. 1 with a preferred embodiment of the invention added to it.

When air is being supplied into the space to be cooled by the evaporative cooler mode of operation shown in FIG. 4, return air flows out of that space upwardly through the return duct 24. Since the damper 40 closes off the circulating air path through the refrigeration unit 10, this return air does not enter into the duct 14 even though that duct is open. This is illustrated by the path of the arrows shown in FIG. 5. This air under pressure, however, does open the damper 48 to the position shown in FIG. 5 and permits the air to be discharged out into the atmosphere surrounding the housing for the evaporative cooler 20. The discharge damper 48 and the hood 52 are located on the side of the housing 20 which faces the refrigeration unit 10, as shown in FIG. 2.

When the evaporative cooler unit is turned off, by turning off the motor 30, the dampers 40 and 48 both return to their closed or downward positions under the force of gravity. If desired, these dampers also could be urged or biased into a closed position by means of springs. Consequently, if neither the refrigeration unit 10 nor the evaporative cooler unit 20 are operated, both of the dampers 40 and 48 for the various air paths into and out of the units are closed.

Figure 6:
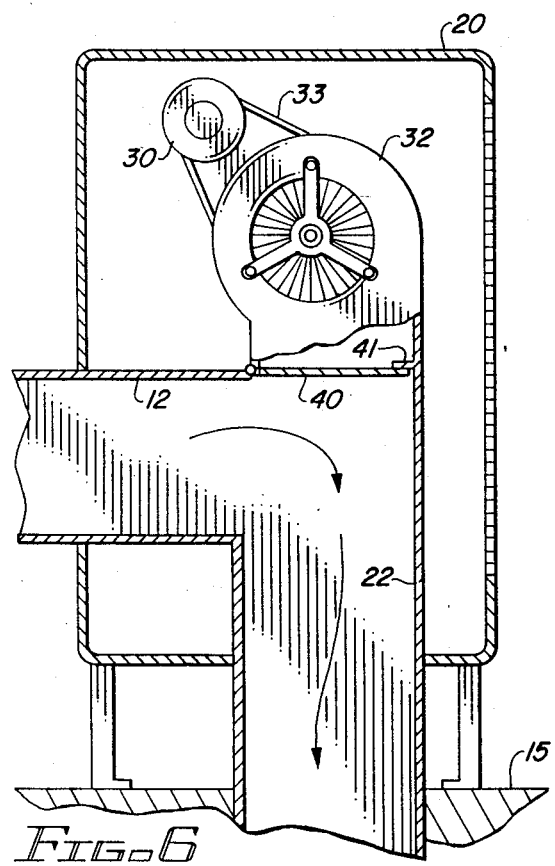
FIG. 6 is a cross-sectional view taken along the same line as FIG. 4, but showing the operation of the unit with the refrigeration unit of FIG. 1 supplying air.
Figure 7:
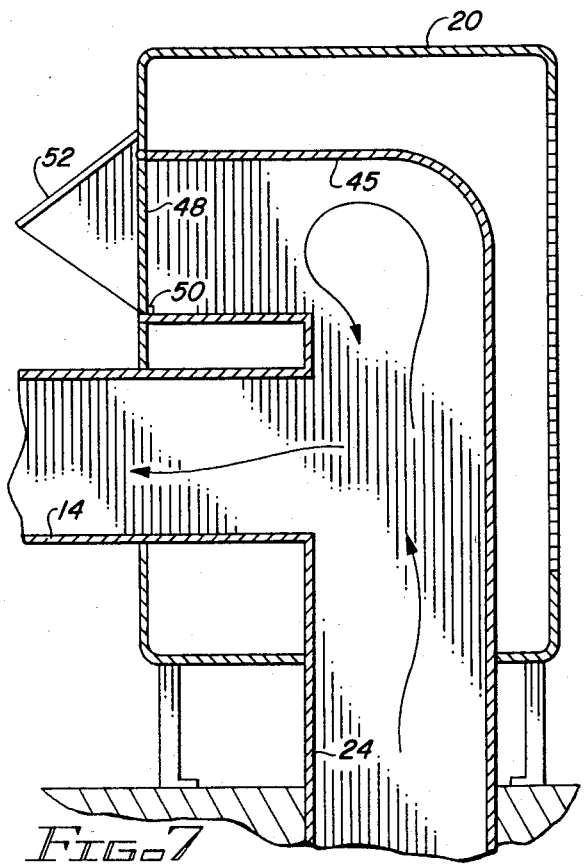
FIG. 7 is a cross-sectional view taken along the same line 5—5 of FIG. 2, showing operation of the unit for the return air flow when the unit is operated in the refrigeration mode of operation.

FIGS. 6 and 7 illustrate the operation of the system when the refrigeration unit is functioning and the evaporative cooler unit is turned off. In this condition of operation, the motor 30 is off, so that the blower 32 is not rotating. Consequently, no air pressure is provided downwardly from the blower 32. When the fan (not shown) of the refrigeration unit 10 is operated, however, a positive air pressure is applied through the supply duct 12 to move the damper 40 from its downward position (FIG. 4) to its upward position closed against the stop 41, as illustrated in FIG. 6. This air then continues to move out of the supply duct 12 into the supply duct 22 where it is discharged into the space to be cooled.

In the refrigeration unit mode of operation, return air passes upwardly through the duct 24 in the same manner described previously for the operation illustrated in FIG. 5. As shown in FIG. 7, this air, however, is withdrawn into the duct 14 by means of the suction created through the air handling unit or fan within the refrigeration unit 10. This in turn causes a partial vacuum to exist in the upper portion 45 of the duct to firmly maintain closed the damper 48 against the stop 50. Consequently, the air flow path is as illustrated by the arrows in FIG. 7 for the return air when the unit is operated in its refrigeration mode of operation.

It should be noted that the dampers 40 and 48 function automatically without any requirement for solenoids, manual movement or the like, to properly select the air flow paths whenever a switch-over from the conventional refrigeration unit 10 operation to the evaporative cooler 20 operation is made and vice-versa. The dampers are situated so that the air pressures which are created within the system when one or the other of the air handlers or blowers is operated cause this automatic switch-over to be effected. As a result, the system is very straight forward and simple in operation, providing an effective combination air-conditioning unit/evaporative cooler unit. The unit is particularly suited for adding on the evaporative cooler 20, along with the duct work shown in FIGS. 3 through 7, to a pre-existing standard refrigeration unit 10. The installation is quickly effected by even semi-skilled workmen.

The foregoing description of the preferred embodiment of the invention is to be considered illustrative only of the invention and not as limiting. Various changes and modifications will occur to those skilled in the art without departing from the true scope of the invention as defined in the appended claims.

I claim:

1. An evaporative cooler unit for use with an existing refrigeration air-conditioning unit having an air outlet for supplying air to a point of use and an air inlet for receiving air from said point of use for recirculation through said refrigeration unit, said cooler unit including in combination:

an evaporative cooler housing with air inlets and a housing air outlet therein;

blower means in said cooler housing, and separate from any air moving means in said refrigeration unit, for drawing air into said cooler housing through the air inlets thereof and supplying air to a blower outlet;

first coupling means coupling said blower outlet with the air outlet of said refrigeration unit in common to said point of use, said first coupling means including first pressure actuated damper means for selectively providing an air flow path from one only of said blower outlet and said refrigeration unit outlet to said point of use; and second coupling means coupling the air outlet in said cooler housing with said air inlet of said air-conditioning unit, said second coupling means including second pressure actuated damper means closing said air outlet in said cooler housing when said refrigeration unit is operated and opening said air outlet in said cooler housing when said blower means is operated to discharge air from said point of use into the area surrounding said cooler housing.

2. The combination according to claim 1 wherein said first and second damper means automatically operate in response to operation of said blower means and operation of said air-conditioning unit to provide said selective air flow paths to said point of use and from said point of use.

3. The combination according to claim 2 wherein said first damper means normally closes said air outlet from said refrigeration unit and opens said blower outlet when neither said air-conditioning unit nor said blower means are operating; and said second damper means closes said housing air outlet whenever said blower means is not operating.

4. The combination according to claim 3 wherein said second damper means normally is gravity closed; and operation of said air-conditioning unit, with said blower means inoperative, causes said second damper means to be tightly closed as a result of a partial vacuum applied thereto as a result of air flowing into the air inlet of said air-conditioning unit.

5. The combination according to claim 4 wherein said first and second damper means are gravity closed damper means.

6. The combination according to claim 5 wherein the air outlet of said refrigeration unit is horizontal and said blower outlet is vertical, said air-conditioning air outlet opening into said blower outlet, with said first damper means extending across said air outlet of said air-conditioning unit and hinged at the top thereof to be normally closed by gravity.

7. The combination according to claim 1 wherein said first damper means normally closes said air outlet from said refrigeration unit and opens said blower outlet when neither said air-conditioning unit nor said blower means are operating; and said second damper means closes said housing air outlet whenever said blower means is not operating.

8. The combination according to claim 7 wherein said first and second damper means are gravity closed damper means.

9. The combination according to claim 1 wherein said second damper means normally is gravity closed; and operation of said air-conditioning unit, with said blower means inoperative, causes said second damper means to be tightly closed as a result of a partial vacuum applied thereto as a result of air flowing into the air inlet of said air-conditioning unit.

10. The combination according to claim 9 wherein the air outlet of said refrigeration unit is horizontal and said blower outlet is vertical, said air-conditioning air outlet opening into said blower outlet, with said first damper means extending across said air outlet of said air-conditioning unit and hinged at the top thereof to be normally closed by gravity.

11. The combination according to claim 1 wherein said first and second damper means are gravity closed damper means.

12. The combination according to claim 1 wherein the air outlet of said refrigeration unit is horizontal and said blower outlet is vertical, said air-conditioning air outlet opening into said blower outlet, with said first damper means extending across said air outlet of said air-conditioning unit and hinged at the top thereof to be normally closed by gravity.

* * * * *